UNITED STATES PATENT OFFICE.

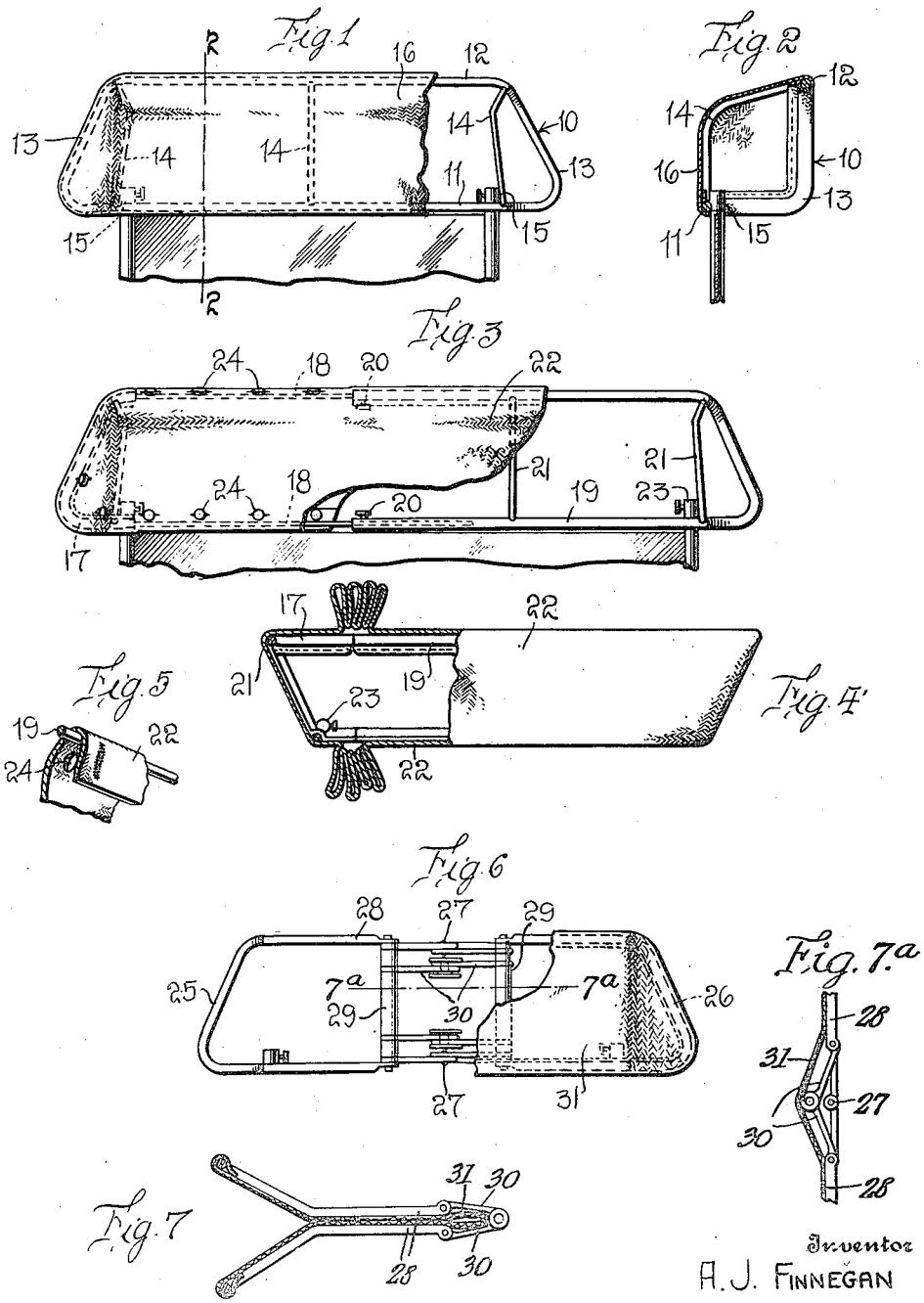

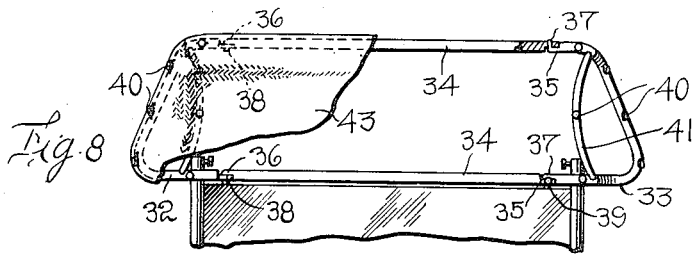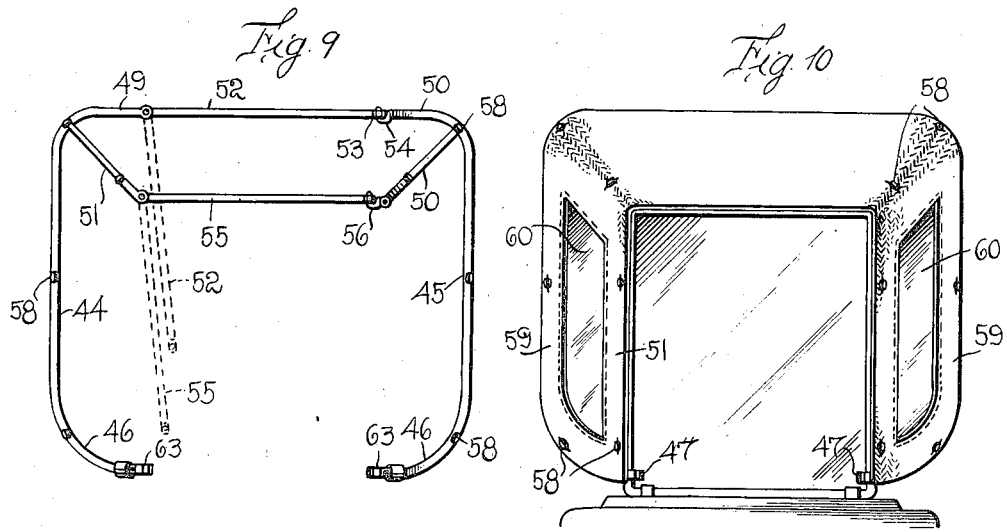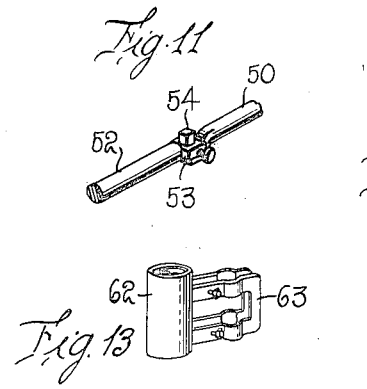

AMBROSE J. FINNEGAN, OF FAYETTE, IOWA.

WIND-SHIELD HOOD.

1,301,115.  Specification of Letters Patent.  Patented Apr. 22, 1919.

Application filed April 4, 1917. Serial No. 159,826.

*To all whom it may concern:*

Be it known that I, AMBROSE J. FINNEGAN, a citizen of the United States, residing at Fayette, in the county of Fayette and State of Iowa, have invented certain new and useful Improvements in Wind-Shield Hoods, of which the following is a specification, reference being had to the accompanying drawings.

This invention relates to automobiles, and particularly to the wind shields thereof, and the general object of the invention is the provision of a hood adapted to be attached to the upper end of the wind shield and project inward therefrom so as to afford a greater amount of protection to the driver of the automobile, than is possible at the present.

It frequently happens that riding in an automobile with the top down that very much wind enters over the top of the wind shield, making it very disagreeable for the driver and for passengers, and another object of the invention is to overcome this difficulty by providing a hood which will deflect the wind upward and which will prevent the wind from sweeping directly backward upon the occupants of the machine.

Still another object of the invention is to provide a hood of the character stated, which may be made in a variety of forms and which is preferably detachable from the wind shield and foldable so that it may be folded into a relatively compact package and easily transported when not in use.

A further object is to provide one form of hood which is particularly adapted for use on wind shields having lateral posts and another form of hood which is adapted to be applied to wind shields having no lateral posts.

Other objects will appear in the course of the following description.

My invention is illustrated in the accompanying drawings wherein:—

Figure 1 is a front elevation of a portion of a wind shield with my improved hood attached thereto, the covering of the hood being partly broken away;

Fig. 2 is a section on the line 2—2 of Fig. 1;

Fig. 3 is an elevation of a portion of a wind shield with another form of hood applied thereto, the cover of the hood being partly broken away;

Fig. 4 is a like view to Fig. 3, but showing the hood in its contracted position;

Fig. 5 is a fragmentary perspective view of a portion of the cover of the hood, showing the manner in which it buttons around the frame;

Fig. 6 is a front elevation of another form of hood, the cover being partly broken away.

Fig. 7 is a top plan view of the same when folded;

Fig. 8 is a front elevation of a portion of a wind shield and still another form of hood applied thereto, the cover being partly broken away and the frame being sectioned in parts;

Fig. 9 is a front elevation of the supporting frame of the hood shown in Fig. 10;

Fig. 10 is a front elevation of a modified form of hood;

Fig. 11 is a perspective view showing the joint between the frame sections in Fig. 8;

Fig. 12 is a front elevation of a wind shield showing detachable posts to be applied thereto, where the wind shield is not constructed with posts;

Fig. 13 is a perspective view of one of the clamping devices illustrated in Fig. 12.

In Fig. 1, I show the simplest form of my invention consisting of a frame 10 of wire or rod iron, or other suitable material. This frame comprises a lower bar 11, a top bar 12 and connecting portions 13, these connecting portions and the top and lower bars being made preferably of one piece of material. The upper and lower bars are connected by angular braces 14 and the lower bar 11 is provided at spaced points with sockets 15 adapted to receive the side posts of a wind shield, that is that form of wind shield which is provided with posts. Extending over the frame formed by the bars 11 and 12, and 13 and 14, is a covering 16 of canvas, rubber, or any other suitable material, the margin of which may be turned over and stitched so as to surround the bars. It will be seen that the ends of this hood project forward and flare laterally so as to provide a shield against wind coming in at the ends of the hood.

The construction shown in Fig. 3 is the same as the one shown in the construction illustrated in Fig. 1, but it differs from the first named construction in that the frame is not composed of one piece of metal, but is constructed of two sections, so that the frame may be contracted in area, thus reducing its size and permitting it to be readily transported. In this form of the invention, an end piece 17 is provided, with longitudinally extending relatively small rods 18, while the remainder of the frame is constructed of a curved tubular member 19 into which the rods 18 telescope. Set screws 20 are used to hold the frame in its expanded position. Braces 21 are also provided which act to hold the covering 22 distended so as to form a hood, as heretofore described, and the lower cross bar of the frame is formed with sockets 23 adapted to engage with the upper ends of the side posts of a wind shield. In Fig. 4, I show this last described construction as folded. Preferably the hood 22 is formed of leather, although canvas, rubber or other suitable material may be used. The edge of this piece of leather is lapped around and sewed to the frame sections 17 and 19, but is not sewed to the rods 18, but the curtain is provided with buttons 24 adjacent that portion of the curtain which is to extend around the rods 18, so that the margins of the curtain may be folded around the rods and buttons when the head is in an expanded condition. When it is intended to telescope the sections into each other, then this portion of the curtain 22 which engages the rods 18 is unbuttoned so that the curtain may fold or ruffle up when the section 17 is shifted toward the section 19.

In Fig. 6 I show another form of supporting frame in which the sections are not telescopically engaged with each other but are pivotally engaged to each other, so that they may be folded over upon each other. The frame in this case is made in two sections 25 and 26, which sections are jointed to each other or pivotally connected as by rivets 27 so that the frame may be folded over into the position shown in Fig. 7. The upper and lower arms of the sections 25 and 26 are formed with openings 28 and disposed in these openings are the reduced ends of cross bars 29, these reduced ends and cross bars being screw-threaded. Rotatably mounted upon the reduced ends of the cross bars 29 are the braces or bow arms 30, which are pivoted to each other by rivets or other suitable means and when the frame is folded up, as illustrated in Fig. 6, these elbow or bow arms 30 break outward and gives the curtain 31 the requisite slack so that the hood can be folded backward. When the hood is folded to its operative position, these elbow arms 30 are sprung outward and they hold the hood in its right shape.

It will be seen that when the members 25 and 26 are in their folded positions, as in Fig. 7, that the arms 30 are nearer to the pivotal point of the member 26 than when the members 25 and 26 are turned to the position shown in Fig. 6, thus giving the necessary slack to permit the parts to be folded.

In Fig. 8 I show still another form of my invention and in this figure, 32 and 33 designate two end sections of a frame which are joined to each other by rods 34. One end of each rod 34 is formed with a square socket 35 and the other end with a downwardly extending lug 36. The square socket 35 receives a square lug 37 on the corresponding end of the section 33, while the section 32 at its ends is formed with eyes 38 to receive the lugs 36 of the corresponding rods 34. The socket 35 is held to the lug 37 by means of set screws 39. One of these lugs and sockets is illustrated in Fig. 11. These sections 32 and 33 are provided with buttons 40, as are the curved braces 41, which connect the upper and lower portions of the sections 32 and 33. The lower portions of the sections 32 and 33 are formed with sleeves 42 to receive the posts of the wind shield. The curtain 43 is buttoned to these buttons 40, or if preferred, straps and buckles may be made in the curtain whereby it may be attached. In Fig. 9 I show still another form of my invention. In this case there are two lateral sections formed of rods 44 and 45. Each of these rods 44 and 45 at its lower end is inwardly bent as at 46 and formed with a clamp 47 adapted to engage with the frame of a wind shield, as illustrated in Fig. 10. The upper ends of the rods 44 and 45 are inwardly turned as at 48 and 49, respectively and to the rod 44 there is attached at its upper end the inwardly extending brace 51 and to the rod 45, adjacent its inner end, the inwardly extending brace 50. To the inwardly turned portion 49 of the rod 44 there is pivoted a rod section 52, which is formed with an eye 53 at its free end adapted to engage with a lug 54 on the portion 48, and pivoted or hinged to the brace 51 is a rod section 55 having an eye at its outer end adapted to engage with a lug 56 on the brace 50. It will be seen that this form of hood not only extends across the top of the wind shield but down on each side thereof and inward of the wind shield at the top and at the sides, and the curtain 57 extends across the top and downward on the sides and buttons to the frame, the frame being provided with buttons 58 and the curtain with button-holes. The side portions 59 of the curtain are formed with windows 60 of celluloid or other transparent material, so that the driver can look out sidewise in turning the machine.

In some makes of automobile, the wind shield is not provided with posts, but with side frames, and in this case it is necessary to provide auxiliary posts adapted to be attached to these side frames. Thus in Figs. 12 and 13, I show a pair of posts 61, the upper ends of which are formed to engage in the sockets in the hood, while the lower ends are screw-threaded into sleeves 62 provided with clamps 63 which are adapted to engage the side frame of the wind shield.

The posts illustrated in Fig. 12 are to clamp the upper part of a lower frame of a wind shield and the clamps are formed by opposed spring jaws urged toward each other by a screw, bolt, or other means of like character.

It will be seen that in every form of my invention, I provide a hood which extends over the top of the wind shield and that in one form I provide also side posts which extend down on each side of the wind shield. It will be seen that the hood in all forms of my invention shades the eyes of the driver so that he can see the road more clearly and this will give him better control of the car. Furthermore, my device gives the driver and the passengers better protection from wind and rain. The construction shown in Fig. 10 gives more protection than the hood alone and fully protects the occupants from wind, which passes around the side edges and over the top of the wind shield. My device can be attached to or removed from the wind shield very quickly and when the device is attached, the upper section of the wind shield may be readily shifted, without trouble.

Having described my invention, what I claim is:—

1. A wind shield hood comprising longitudinally extending upper and lower supporting members, the members being disposed in different vertical planes, members connecting said upper and lower members and holding them in spaced relation, a cover of flexible material held to said longitudinal members and supported by the connecting members, and means on one of said longitudinal members for supporting the hood on a wind shield with the hood extending rearward of the shield, said means including laterally spaced clamps.

2. A wind shield hood comprising a longitudinally extending lower member, a longitudinal upper member disposed in parallel relation with but in a different vertical plane from the lower member, one of said members being provided with clamps for engagement with a wind shield, said clamps being arranged to support the hook extending rearwardly from the wind shield, obtusely angled braces attached to said upper and lower members, and a covering of flexible material attached to said upper and lower members and distended by said braces.

3. A hood for wind shields comprising a metallic frame formed to extend rearward and upward at its top and rearward and laterally at its ends and having means for engaging the hood with the side posts of a wind shield, said frame being formed in two sections having shiftable engagement with each other, and a covering of flexible material mounted upon the sections.

4. A hood for wind-shields comprising a metallic frame including upper and lower longitudinally extending bars connected to each other at their ends, the ends being laterally bent in divergent relation to each other, one of said bars being provided with means for clamping it to the frame of a wind-shield, said frame being formed of two sections detachably connected to each other, and a covering of flexible material detachably mounted upon the sections.

5. As a new article of manufacture, a hood for wind shields comprising a metallic frame bent to extend inward at its top and ends and having sockets for engagement with the side posts of a wind shield, said frame including upper and lower longitudinally extending supporting members and said frame being formed of two sections connected to each other to relatively shift, and a hood of flexible material mounted upon the sections, the sections being shiftable into or out of an expanded position.

6. As a new article of manufacture, a hood for wind shields comprising a metallic frame bent to extend inward at the top and ends, said frame including upper and lower longitudinally extending supporting members and having means for engagement with the side posts of a wind shield, and a curtain attached to the frame, said frame being formed of two sections having shiftable engagement with each other, and means for holding the sections detachable in an expanded position.

7. The combination with the wind-shield of an automobile, of a hood comprising a supporting frame detachably connected to the shield and extending upward and rearward therefrom, and having rearwardly and laterally deflected end portions, and a covering attached to said frame.

8. As a new article of manufacture, a hood for wind shields comprising a metallic frame bent to provide upper and lower frame bars, the upper frame bar being disposed in a plane rearward of the lower frame bar, and the frame bars being bent at their ends to form rearwardly and laterally extending portions, means whereby said frame may be clamped upon the wind shield of an automobile to extend rearward therefrom, and a hood of flexible material adapted to extend over the frame there being buttons on the frame to which the hood is detachably connected.

In testimony whereof I hereunto affix my signature in the presence of two witnesses.

AMBROSE J. FINNEGAN.

Witnesses:
  GEO. F. BERNHARD,
  JOHN KEARNS.